March 29, 1938. E. E. WINKLEY 2,112,428
MEASURING MACHINE
Filed March 2, 1936 4 Sheets-Sheet 1

INVENTOR
Erastus E. Winkley
By his attorney
Victor Cobb

March 29, 1938.   E. E. WINKLEY   2,112,428
MEASURING MACHINE
Filed March 2, 1936   4 Sheets-Sheet 2
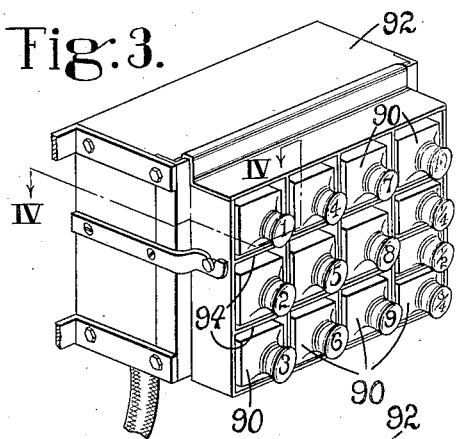
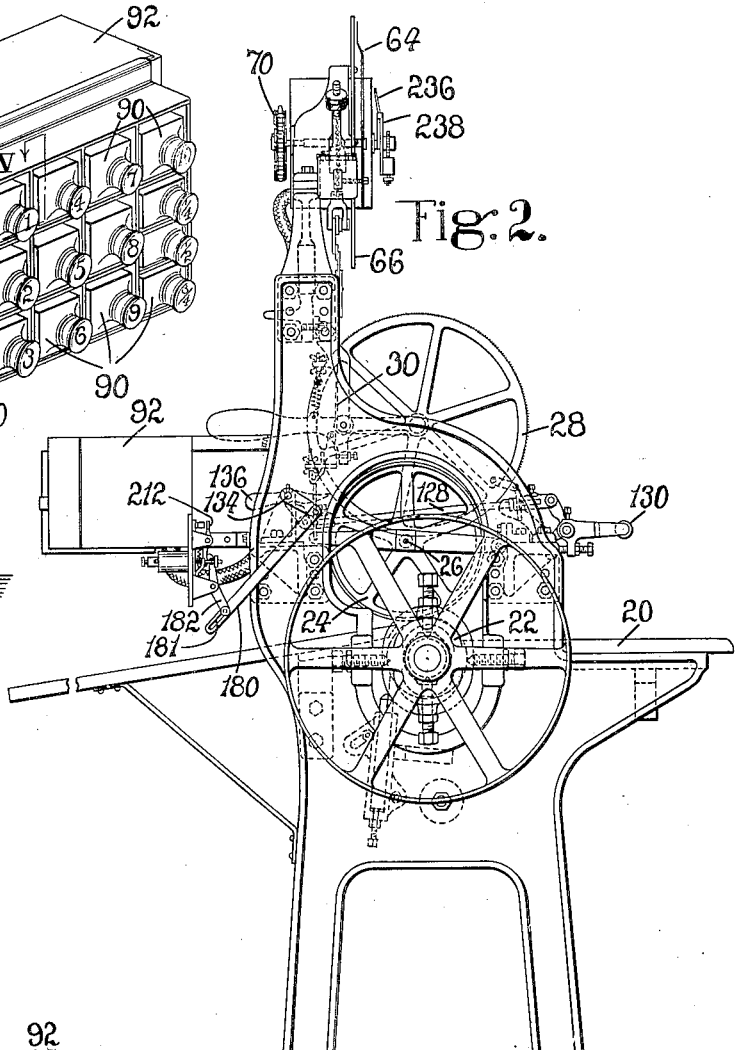
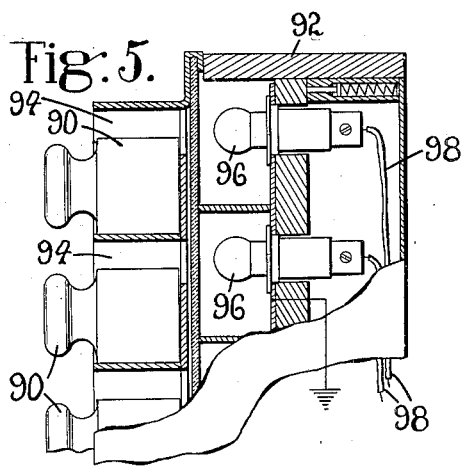

March 29, 1938.   E. E. WINKLEY   2,112,428
MEASURING MACHINE
Filed March 2, 1936   4 Sheets-Sheet 3

INVENTOR
Erastus E. Winkley
By his attorney
Victor Cobb

March 29, 1938.  E. E. WINKLEY  2,112,428
MEASURING MACHINE
Filed March 2, 1936  4 Sheets-Sheet 4
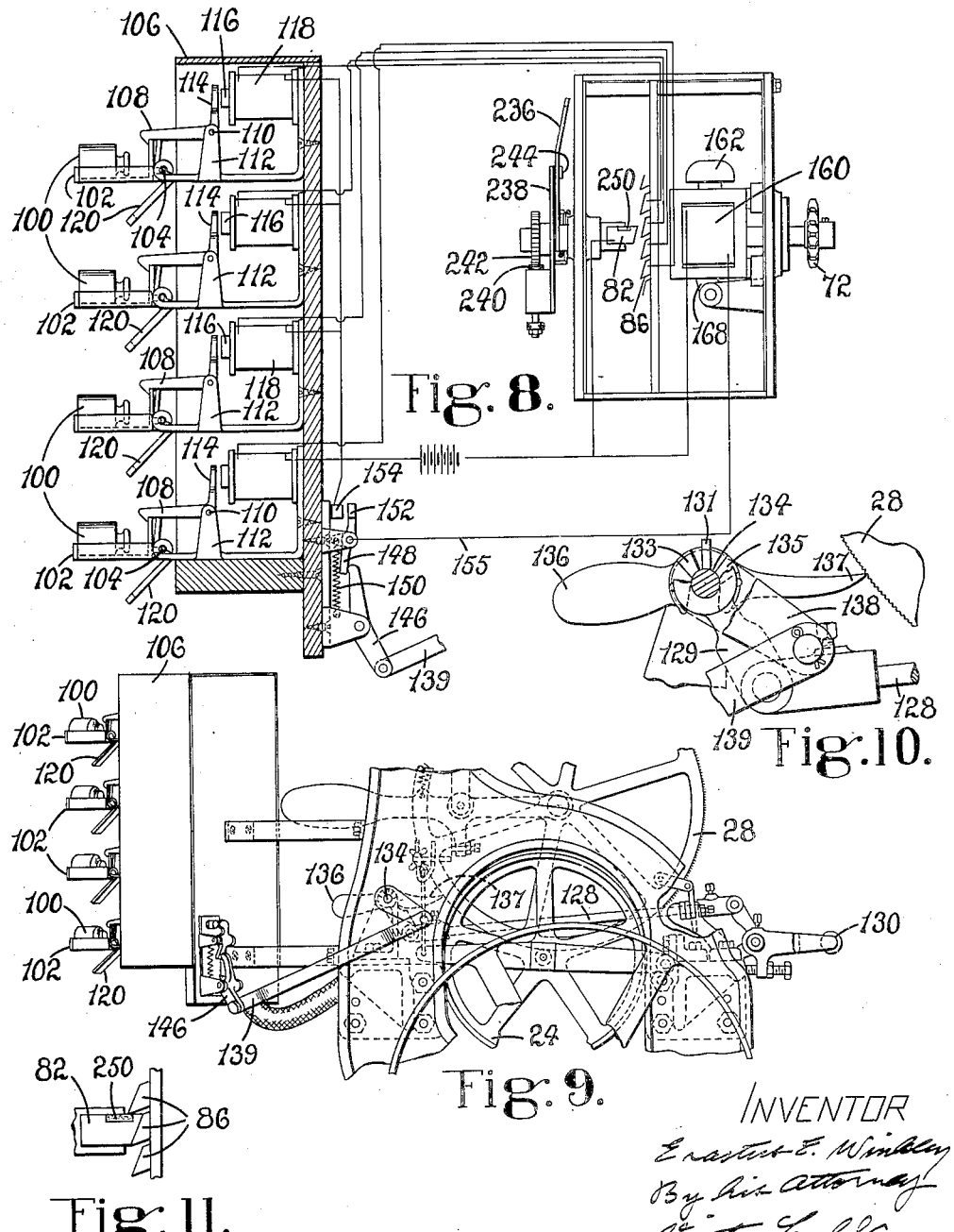

Patented Mar. 29, 1938

2,112,428

UNITED STATES PATENT OFFICE 2,112,428

MEASURING MACHINE

Erastus E. Winkley, Lynn, Mass., assignor to United Shoe Machinery Corporation, Paterson, N. J., a corporation of New Jersey Application March 2, 1936, Serial No. 66,601

17 Claims. (Cl. 33—124)

This invention relates to measuring machines. While the invention is illustrated as embodied in a machine for measuring superficial areas of hides, skins and leather, it is to be understood that the invention and various important features thereof may have other applications and uses.

It is an object of the invention to facilitate the marking of measurements upon pieces of work as they are passed successively through a measuring machine. As illustrated herein I have provided an arrangement in which the stamping operations are under manual control, thereby providing a relatively inexpensive construction which will appeal to the small manufacturer of leather products. Furthermore, it is readily adaptable to pieces of work of widely different ranges of dimensions.

To these ends, and in accordance with an important feature of the invention, there is provided a suitable number of stamps supported independently with respect to each other in association with novel means to point out or select, at the end of a measuring operation on a given piece of work, the proper stamp to be used in marking the measurement on that piece of work, the arrangement being such that the pointing-out or selecting means is controllable by a machine for measuring dimensions of successive pieces of work. Conveniently, a suitable number of stamps are supported in a predetermined orderly arrangement in a special receptacle having an equal number of indicating devices associated with the stamps and arranged to be controlled by the measuring machine in such manner that, following a measuring operation, the proper stamp is pointed out or selected to record the results of the measurement upon the piece of work just measured.

In one embodiment of the invention, the stamp which corresponds to the measured piece of work is moved to a position where it may be readily picked up by the worker stationed there to stamp the measurements on the pieces of work as they come from the machine, it being understood that the positioning of the selected stamp in the manner described is in itself sufficient to call the attention of the worker to the correct stamp for the occasion.

In another embodiment of the invention, the proper stamp is indicated by means of a light bulb associated with the pocket in which the individual stamp is housed in the stamp receptacle, the indicating operation taking place at the end of each measuring operation on the pieces of work being passed through the machine.

These and other important features of the invention and novel combinations of parts will now be described in detail in the specification and then pointed out more particularly in the appended claims.

In the drawings,—

Fig. 2 is an end view of the machine shown in Fig. 1 looking from the left in said figure;

Fig. 3 is a perspective view of a stamp receptacle;

Fig. 4 is a sectional view taken along the line IV—IV of Fig. 3;

Fig. 5 is a sectional view of the stamp receptacle shown in Fig 3 looking in a direction at a right angle to the section of Fig 4;

Fig. 8 is another view of the contact box showing electrical connections to another embodiment of means for indicating the correct stamp to be used in stamping a piece of work;

Fig. 9 is a view similar to Fig. 2, with parts broken away, showing control mechanism for the indicating means of Fig 8;

Figs. 10 and 11 show details of construction; and

Figure 1:
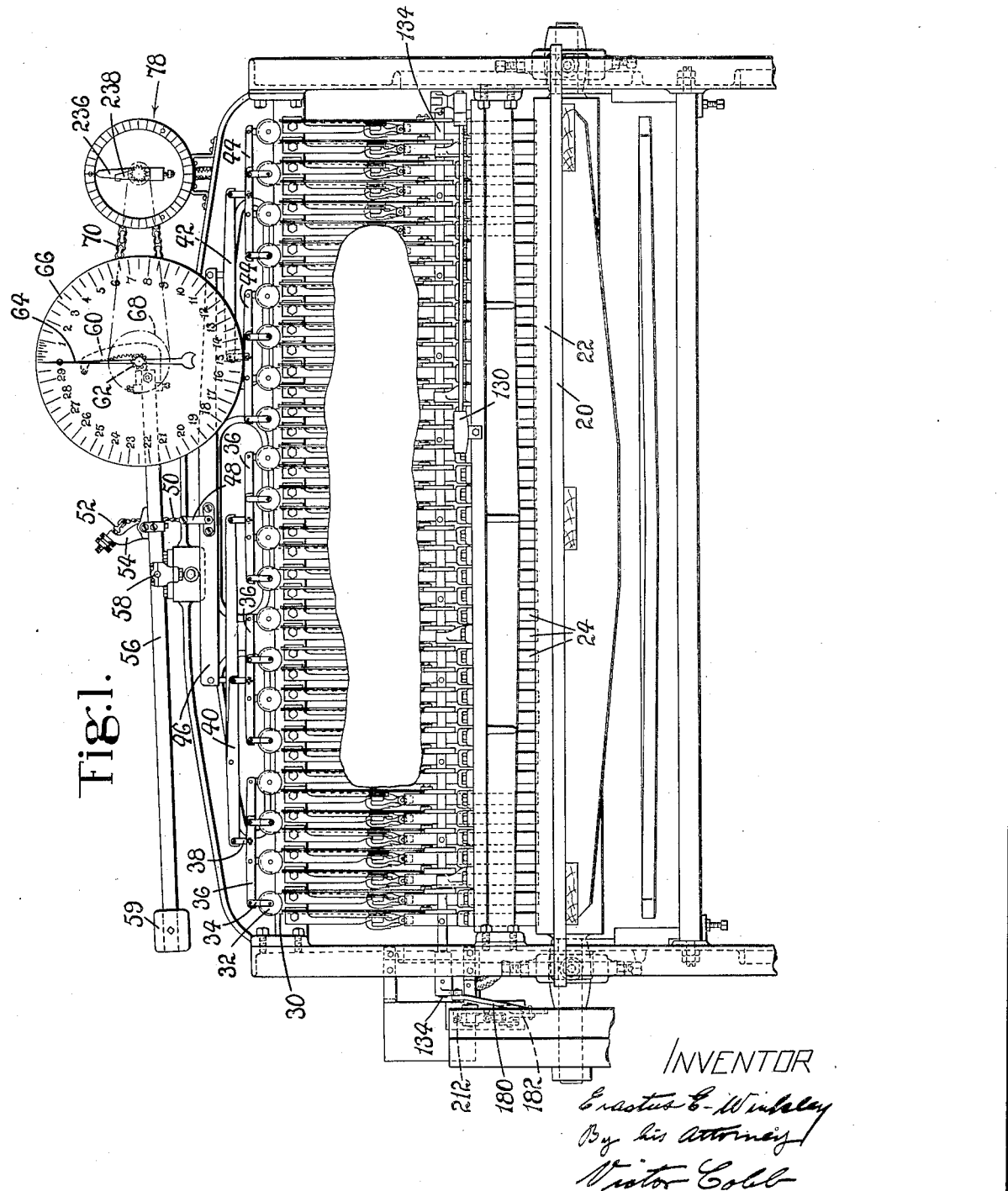
Fig. 1 is a view in front elevation, partly broken away, of an area measuring machine of a well-known type with my invention embodied therein.

In the illustrated construction, which is specially designated to facilitate the measurement and marking of hides and skins, there is provided a measuring machine of the Sawyer type, such as that disclosed in United States Letters Patent No. 931,144, granted to the Peabody Leather Company as assignee of L. O. Ramsdell, on August 17, 1909. In this machine there is a table 20 over which the pieces of work are shoved into engagement with a bed roll 22 (Figs. 1 and 2), a plurality of measuring wheels 24 being provided above the bed roll 22 in position to press the piece of work against the bed roll so that the measuring wheels 24 co-operate with the bed roll in feeding the piece of work while the said wheels are themselves rotated through contact with the work passing over the bed roll 22 which is power driven by means not shown. Each measuring wheel 24 has secured thereto coaxially therewith a small pinion 26 (Fig. 2) arranged in mesh with a relatively large toothed wheel 28 mounted loosely on a shaft well above the axes of the measuring wheels. It will be understood that rotation of a measuring wheel 24 results in corresponding rotation of its associated wheel 28. Secured to the hub of the wheel 28 so as to wind thereon is a steel tape 30 (Figs. 1 and 2) which passes around a roll 32 and is attached to the hub of the next adjacent wheel 38. As shown in Fig. 1 the rollers 32 are pivotally carried by links 34 supported by an equalizing lever 36 in turn pivoted by a link 38 to an equalizing lever 40, the lever 40 supporting three similar levers 36 while another lever 42, similar to the lever 40, supports two equalizing levers 44 similar to the levers 36. The levers 40 and 42 are pivotally connected to a larger equalizing lever 46 pivotally supported by a link 48 connected by a chain 50 to an adjustable bolt 50 supported on a bracket 54 carried by a lever 56 pivoted at 58 on the frame of the machine. It will be understood that the levers 36, 40, 42, and 46 constitute parts of a totalizing mechanism by which the movements of the measuring wheels 24 are caused to effect movement of the lever 56 in accordance with the respective areas of the pieces of work being measured. At one of its ends the lever 56 is provided with an adjustable weight 59 and at its other end with a curved rack bar 60 (Fig. 1) arranged in mesh with a pinion 62 to the shaft of which is fastened a pointer 64 movable over a dial 66 having on its face numerals in regular spaced relation to indicate the measurement of the piece of work which has just passed through the machine under the measuring wheels 24. For a more detailed showing of the measuring machine just described reference should be had to the patent to Ramsdell referred to above. While a measuring machine of the Sawyer type has been used in illustrating the application of the invention, it will be understood that this was a matter of convenience and that the invention may be applied to measuring machines of other types.

Figure 6:
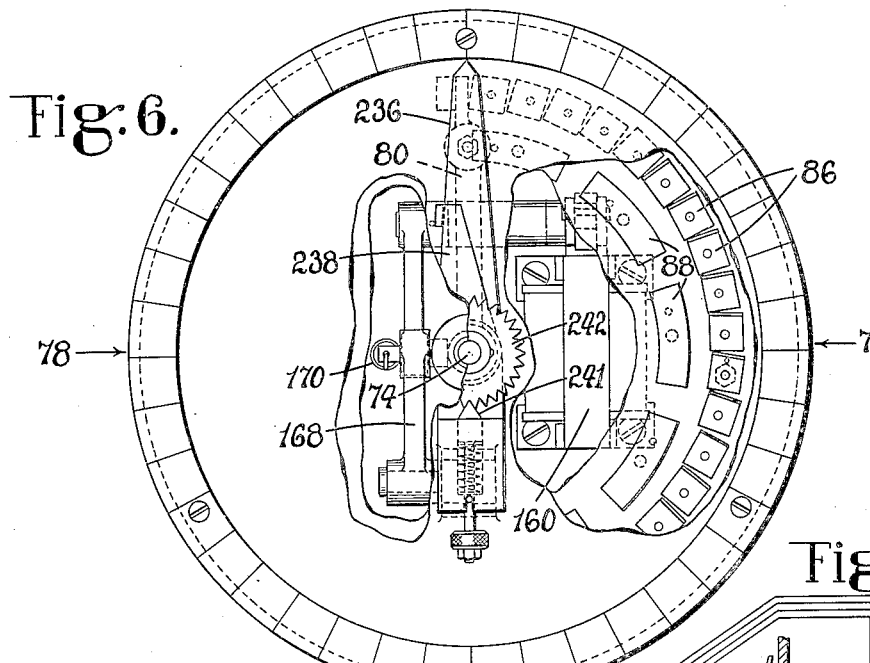
Fig. 6 is an enlarged plan view partly of the electrical contacts associated with a movable pointer of an indicating mechanism.
Figures 7, 12:
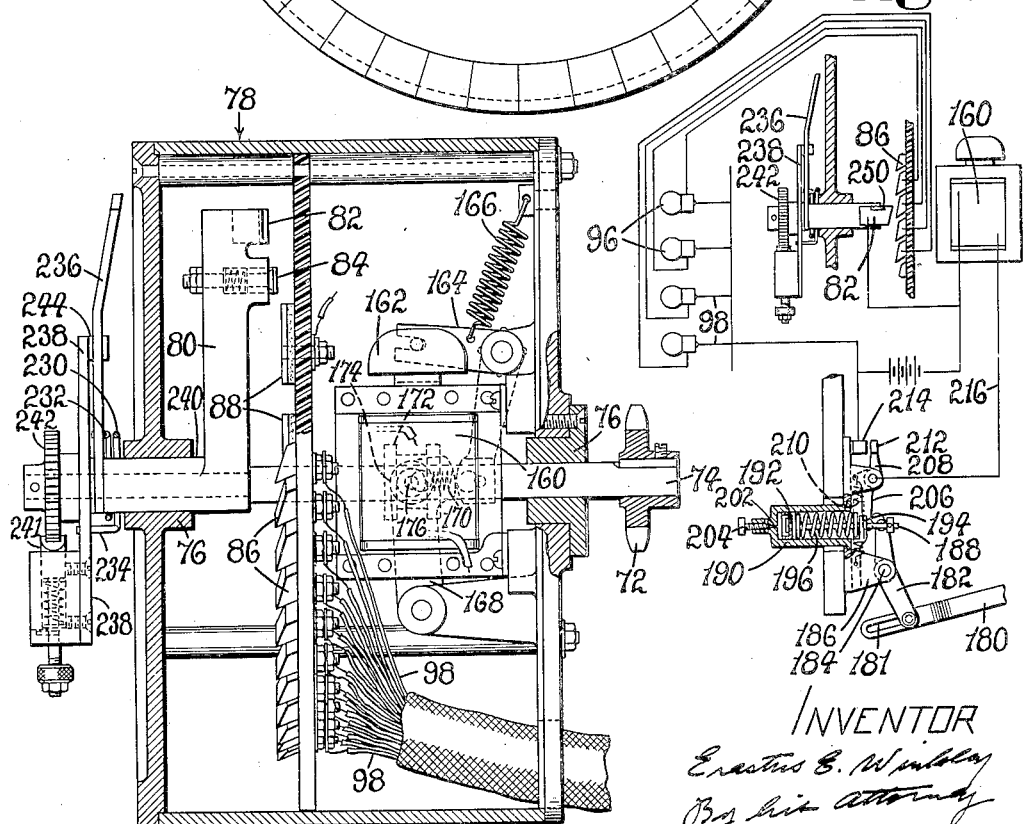
Fig. 7 is a vertical sectional view of the contact box shown in Fig 6.
Fig. 12 is an enlarged view of certain parts shown in Fig. 2.

Secured to the shaft of the pinion 62 (Fig. 1) is a sprocket wheel 68 about which passes the sprocket chain 70 arranged to pass also around another sprocket wheel 72 (Figs. 1, 7 and 8). This sprocket wheel 72 is fastened to a shaft 74 mounted for rotation and for axial movement in journals 76 (Fig. 7) provided at the horizontal axis of a contact box 78. Mounted on the shaft 74 for movement therewith is an arm 80 carrying electrical contact members 82, 84 adapted to be brought into contact selectively with contact blocks of two rows of blocks 86, 88 (Figs. 6 and 7) contact member 82 being arranged to co-operate selectively with the blocks 86 while contact member 84 co-operates with the blocks of the row 88. It is to be understood that the contact member 82 moves in a plane, during rotation of the shaft 74, spaced from the plane defined by the projecting edges of the contact blocks 86, and that contact member 84 is similarly displaced from the plane of the contact blocks 88 during rotation of said shaft 74. Hence when the shaft 74 has reached the end of its rotation corresponding to the position of the pointer 64 on the dial 66 (Fig. 1), the shaft 74 is moved axially to the right in Fig. 7 to bring the contact members 82 and 84 into contact with the blocks directly opposite to them, that is, contact member 82 will strike one of the blocks in the row 86 while contact member 84 will strike one of the blocks in the row 88 unless contact member 84 happens to be positioned in one of the spaces between the blocks 88 of said row. This contact between the contact member 82 and one of the blocks in the row 86 and the contact between contact member 84 and one of the blocks in the row 88 will result in the operation, by electrical means, of an indicating mechanism at the back of the measuring machine whereby a worker at the back of the machine will have indicated to him the proper stamp to be used to stamp the measurement on the piece of work just measured by the machine.

In that embodiment of the invention illustrated in Figs. 2 to 5, inclusive, a plurality of stamping blocks 90 are carried in a receptacle 92 having pockets 94 for the stamps 90. These stamps or stamping blocks 90 do not fill their respective pockets. Hence, there is a space above each block through which light may be observed from a lamp bulb 96 (Figs. 4 and 5) positioned back of the said space, there being a lamp bulb 96 back of each pocket in a separate compartment. It will be understood, of course, that only one of the lamp bulbs 96 will be lighted at any given time back of the pockets in which are located the stamps carrying whole numbers. If, however, the measurement of the piece of work includes one of the fractions ¼, ½ and ¾ then, of course, a corresponding lamp bulb back of one of these fractional stamps will also be lighted. When, therefore, at the end of a measuring operation, one or both of the contact members 82 and 84 are caused to contact selectively with a contact block in one or both of the rows of blocks 86, 88, a corresponding lamp or lamps will be lighted in the stamp receptacle 92. As indicated above, only one light bulb may be lighted in which case the piece of work will be stamped with a whole number such as 3, 5, or 8, while, if the work piece is of a size to demand one of the fractional measurements such as ¼, ½ and ¾, one of the lamps back of these blocks will also be lighted, thus indicating its use to the worker whose duty it is to stamp the proper measurement on the work piece. It will be understood that the lamp bulbs 96 are electrically connected each with a corresponding contact block in the rows of contact blocks 86 and 88, the said connections being indicated by wires 98 in Figs. 4, 5, 7 and 12.

In another embodiment of the invention illustrated in Figs. 8 and 9, stamping blocks 100 are carried each by a pivoted supporting member or pocket 102 hinged by a pivot 104 to a receptacle box 106. As clearly shown in Fig. 8, each supporting member or pocket 102 is held in horizontal position by means of a latch member 108 pivoted at 110 to a bracket 112, the said latch member 108 having an arm 114 located in closely spaced relation to an armature 116 of an electromagnet 118 which may be placed in circuit with its corresponding contact block on one of the rows of blocks 86 and 88. When such circuit is closed a magnet 118 is energized, thus causing movement of a latch 108 upwardly in a direction to release a support or pocket 102 which immediately drops down against a bracket 120 where it remains until the workman has used the stamping block thus indicated and returned the support 102 to its upper horizontal position. In this form of the invention, the stamping block to be used is indicated by the fact that the support for the block has fallen down in the manner described above, carrying the stamping block with it. Naturally the indication as to the proper stamping block to be used is maintained for as long a time as may be necessary and until the worker returns the stamping block and its support to its original position. Since the stamping block to be used for marking any given piece of work is indicated to the workman in this embodiment of the invention by an abnormal positioning of the selected stamp, there is no objection from the worker's standpoint to a system wherein a very large number of stamping blocks are employed. Hence, the receptacle in this embodiment of the invention may contain stamps carrying, respectively, numbers 1, 1¼, 1½, 1¾, 2, 2¼, 2½, etc. In a way, this facilitates the marking operation since the worker has to handle only one stamp, whereas, in the first embodiment of the invention described above, he must handle two stamps in the majority of cases, that is, one stamp representing a whole number and another stamp representing a fractional number. It will be understood that this system of individual stamps for whole numbers and fractional numbers makes it possible to employ a relatively small receptacle which is thus sufficiently under inspection by the worker as to make it very unlikely that he will miss the indicating light or lights within the time allowed. In case the stamps are to carry whole numbers and also whole numbers together with fractional numbers on the individual stamps, as in that embodiment of the invention illustrated in Figs. 8 and 9, only one row of contact blocks will be provided in the contact box 78, namely the row 86.

Measuring machines are commonly so constructed that, at the end of a measuring operation, all of the measuring wheels and, perforce, the indicating means also, are locked to maintain the indication until it can be observed and recorded in some manner. Heretofore, the operator at the front of the machine called off the reading of the pointer of the indicating means to a worker at the back of the machine so that the latter could mark the work piece accordingly. Following this, the machine was tripped by the operator through manipulation of a handle shown at 130 (Figs. 1, 2 and 9). When this handle is shoved upwardly it operates through a link 128 and an arm 129 (Figs. 2, 9 and 10) to rock a shaft 134 carrying a plurality of pawls 136, the operative ends 137 of which are engaged with selected teeth on the periphery of the associated wheels 28. It will readily be understood that, upon lifting upwardly on the handle 130, the pawls 136 are rocked in a clockwise direction (Figs. 2, 9 and 10) to release their associated wheels 28, the result being that all of the wheels 28, together with their associated measuring wheels 24, are returned to initial position through connections leading to the weighted lever 56 (Fig. 1). This means, of course, that the pointer 64 (Fig. 1) returns to zero position on the dial 66. It is convenient to utilize the handle 130 to effect operation of the indicating means at the back of the machine by which the worker there is informed as to the stamp that should be used to mark the piece of work just measured. In other words, upward movement of the handle 130, in the illustrated construction, will cause lighting up of the proper light bulb 96 in that embodiment of the invention disclosed in Figs. 2 to 5, inclusive, or, alternatively, effect positioning of a stamp block by dropping the same to an inclined position, as disclosed in that embodiment of the invention shown in Figs. 8 and 9. While it is convenient to employ the handle 130 and certain connected parts in the mechanism for the purpose of controlling the indicating means at the back of the machine, it will be understood that other means might readily be provided for the purpose.

When the handle 130 is used to initiate operation of the indicating means at the back of the machine as well as to trip the measuring mechanism and the indicating means at the front of the machine, it is necessary to provide connections such that the indicating means at the back of the machine will become operative before the tripping action takes place. It is usual to mount the pawls 136 (Fig. 10) movably on the shaft 134, a pin 131 rigid with the shaft 134 being positioned between spaced shoulders 133, 135 on the pawl 136 so that when the shaft 134 is rocked by operation of the handle 130 there is a substantial rotative movement of the shaft 134 before the pawls 136 are operated to trip the machine. Hence the indicating means at the back of the machine can be operated by the shaft 134 before the pawls are operated. For this purpose an arm 138 is rigidly connected to the shaft 134 and has pivotally connected thereto a link 139 operative to initiate operation of the indicating means of Figs. 8 and 9, as will now be described. Upon movement of the link 139 to the left in Figs. 8 and 9, a lever 146 pivotally connected to said link 139 is rocked in a clockwise direction to release a lever 148 which is instantly turned in a counterclockwise direction by a spring 150, whereby contact is made between an end 152 of said lever and a contact block 154, whereby an electrical circuit 155 is completed through the closure of the gap between 152 and 154. Closing of the circuit 155 energizes an electromagnet 160 (Figs. 7 and 8) thereby moving a member 162 (Fig. 7) in a downward direction by which a bell crank lever 164 is rocked against the tension of a spring 166 in a counterclockwise direction with the result that a lever 168, connected to the lower end of the bell crank lever 164 by a spring 170, is pulled to the right in said Fig. 7 thereby shifting the shaft 74 axially to the right, it being understood that the upper end of the lever 168 is provided with a bifurcation 172 engaged with a roll 174 on a stud 176 fastened to a collar on the shaft 74, the collar being rotatable on the shaft but not movable lengthwise thereof. This movement of the shaft 74 to the right in Figs. 7 and 8 carries the contact member 82 on the arm 80 into contact with the proper contact block of the row 86 of such blocks. Upon making this contact, a circuit is established between said contact block in the row 86 and its associated magnet 118 in the receptacle box 106 (Fig. 8) thereby causing a stamp support 102 and the stamp 100 carried thereby to drop down against the bracket 120, in this way indicating to the worker at the back of the machine the proper stamp to be used in marking the piece of work which has just been measured. It will be understood that in this embodiment of the invention it is sufficient to have a momentary closing of the circuit 155 prior to tripping of the pawls 136, since such operation effects positioning of the proper stamp block in such manner that the indication cannot be overlooked by the worker since it is maintained as long as may be necessary. In fact, the worker himself must return the stamp support 102 to its normal upward position after he has used the corresponding stamp block 100.

In that embodiment of the invention illustrated in Figs. 2 to 5, inclusive, and Fig. 12, a light bulb associated with the selected pocket and stamp block 90 in the receptacle 92 is lighted to indicate the proper stamp to be used. If this lighting of the bulb were to take place only momentarily, the indication thus given might be missed by the worker at the back of the machine. Hence it is desirable to provide means for maintaining the lighting of the selected bulb for a substantial period of time which may be varied to suit the worker. Accordingly, a link 180 (Figs. 2 and 12) is substituted for the link 139 (Figs. 8 and 9), said link 180 having a lost motion connection (through a slot 181) with a lever 182 (Fig. 12) pivoted at 184 upon a bracket 186, the other end of the lever 182 being forked to receive and operate a rod 188 which extends into a casing 190 and is connected to a piston 192 snugly fitted in the casing 190. Extending between the piston 192 and a stationary cap member 194 is a spring 196 which tends constantly to return the piston to its position near the bottom of the casing 190. As the rod 188 and its connected piston 192 are moved toward the right in Fig. 12, air is admitted freely into the bottom of the casing past the flexible-edged piston, as in the well-known bicycle air pump, so that the operator, who is manipulating handle 130, has merely to compress the spring 196. It will be understood that as an alternative construction the piston 192 may be made rigid throughout and that air may be admitted into casing 190 through a suitable opening in the casing provided with an automatic closing valve. As soon as the spring 196 starts moving the piston 192 in the opposite direction, the air within the casing 190 must escape through a very small opening 202 regulated by a needle member 204, thus retarding movement of the rod 188 to the left in Fig. 12 to such rate as may be desired. In the meantime, the handle 130, the parts connected thereto, and the parts tripped by the operation of said handle may return to initial or normal position, without affecting lever 182 due to the pin and slot connection between the lever 182 and link 180. It will be understood that movement of the upper bifurcated end of the lever 182 to the right in Fig. 12 releases a second lever 206 which has a shoulder engaged with a co-operating shoulder on a lever 208 which is constantly urged in counterclockwise direction by a spring 210. Hence, upon operation of the lever 206 in the manner described, the lever 208 is moved in a counterclockwise direction by said spring 210 to close the contact members 212, 214, thereby closing an electrical circuit indicated at 216. Furthermore, this circuit remains closed until the spring 196 in the casing 190 has returned the piston 192 substantially to its initial position. During all the time that the circuit 216 is closed, a selected lamp bulb 96 in the stamp receptacle 92 (Figs. 2 to 5, inclusive, and Fig. 12) has remained lighted. Closing of the circuit 216 energized the magnet 160 (Figs. 7 and 12) and effected movement of the shaft 74 to the right in Fig. 7 whereby the contact member 82 has been brought into contact with a selected contact block in the row 86 and the contact member 84 into contact with one of the contact blocks in row 88 as heretofore described. If contact members 82 and 84 on the arm 80 contact with blocks in both of the rolls 86 and 88 there will be lighted a light bulb back of one of the whole-number blocks in the receptacle 92 and also a light bulb back of one of the fractional stamp blocks (¼, ½ or ¾) in the said receptacle 92, thus indicating clearly to the worker the stamp blocks to be used in stamping the measurement on the piece of work just measured. When the spring 196 (Fig. 12) has returned the piston 192 nearly to normal position, the circuit 216 is broken by separation of the contact members 212 and 214. Hence the lamp bulb in receptacle 92 is de-energized.

Upon inspection of Fig. 6 of the drawings it will be observed that with the illustrated size and spacing of the contact blocks 86 and 88 the range of measurement for pieces of work is relatively limited. It is assumed that the smallest piece of work which will be measured using the set up illustrated in Fig. 6 is at least 1¼ square feet in area and with a maximum of 10 square feet. In other words, the first block in the row of blocks 88 when contacted will light the lamp bulb in the pocket containing number 1 stamp whereas the first block to the right of the pointer in Fig. 6 in the row of blocks 86 when contacted will light a lamp bulb in the pocket of stamp ¼. The next contact block in the row of contact blocks 86 corresponds to stamp ½ and the third contact block corresponds to stamp block ¾. It is to be understood, then, that the long contact blocks in the row of blocks 88 correspond to numbers 1, 2, 3, 4, 5, etc. up to 10 while the smaller contact blocks in row 86, directly opposite to these longer blocks 88, always represent the fractional stamp blocks ¼, ½ and ¾, respectively. This leaves the small contact blocks in the row 86 which are located opposite to the spaces between the longer contact blocks in the row 88 to serve as contact blocks when only one lamp bulb is to be lighted in the stamp block receptacle, that is, when the area of the work piece comes to a whole number without any fractional part. Hence these small contact blocks in the row 86 located opposite to said spaces in the row 88 correspond to lamps and stamp blocks 1, 2, 3, 4, etc. up to 10. For example, if the arm 80 with its contact members 82, 84 should be positioned at the end of a measuring operation slightly beyond a right angle from the position shown in Fig. 6, it would indicate a measurement of 3¾ square feet, whereas if these parts 80, 82, 84 stopped over the space between the longer contact blocks 3 and 4 there would be indicated a measurement of exactly 4 square feet.

As stated earlier in this specification, the arrangement shown in Fig. 6 is particularly adapted for use in a mechanism wherein the indicating means for the worker at the back of the machine comprises a receptacle having lamp bulbs for the indicating means, as disclosed in Figs. 2 to 5 inclusive, for the reason that in this arrangement the number of stamp blocks must be kept to the minimum since the operator must often see two lights simultaneously pointing to two different stamp blocks being used, namely a whole number and a fractional number. On the other hand when the indicating device is substantially that shown in Fig. 8, wherein the stamp support, together with the contained stamp, drop to a new position to indicate the stamp to be used, the number of stamps may be very much enlarged without risk of the indication being missed by the worker. Hence the arrangement in Fig. 6 may be modified, when used in connection with the indicating means of Fig. 8, to the extent of not using the contact blocks in row 88 but only those in row 86 in which case these contact blocks will be the equivalent of stamps bearing measurement figures 1¼, 1½, 1¾, 2, 2¼, 2½, 2¾, 3, 3¼, etc. in the receptacle 106 (Fig. 8).

In any case, it will be clear that the work pieces that can be measured by this mechanism as thus far disclosed fall within a limited range of areas. However, to overcome this difficulty, the arm 80 (Figs. 6 and 7) with its contact members 82, 84 is rotatably mounted on the shaft 74 and is held in position by engagement of a spring 230 fastened to pins 232, 234 respectively on a pointer member 236 and an adjustable pusher member 238, of which the pointer member 236 is pinned to a sleeve 240 which is integral with the arm 80 carrying contact members 82 and 84. The pusher member 238 is provided with a spring pressed plunger 241 adapted selectively to engage teeth of a toothed member 242 rigidly secured to the shaft 74. The pusher member 238 has a lug 244 which contacts with the pointer 236 and causes the latter, together with the arm 80, to rotate with the shaft 74. To increase the range of work pieces which may be measured it is necessary only to move the pusher member 244 in a counterclockwise direction to a position 180° (for example) from the position shown in Fig. 6. Now the shaft 74 will rotate the pusher 238 and the pointer 236 through 180° before the latter reaches what is the normal starting point (shown in Fig. 1) to begin movement over the newly selected range of contact blocks 86, 88. It will be understood that, if this be done, the initial rotation of the shaft 74 through the 180° (just referred to) will be the same for all skins of a range in which six and one-quarter square feet is the minimum size, this setup being useful for instance in the measurement of sheepskins wherein the range is from about 6¼ square feet in the smaller skins to 10¼ square feet in the larger skins. In that case, the stamp block now shown in the upper left-hand pocket of the receptacle 92 (Fig. 3) as bearing the number 1 would be replaced by a block bearing the numeral 6. Number 2, below number 1, would be replaced by a stamp block bearing number 7, and number 3 by a stamp block bearing number 8 with corresponding changes in the rest of the receptacle excepting that the fractional blocks ¼, ½ and ¾ would be undisturbed. Similarly, a new set of blocks will be placed on the block supports 102 in that embodiment of the invention disclosed in Fig. 8. It will be understood, therefore, that a wide range of work pieces may be measured and have the measurements indicated to the worker at the back of the machine by making suitable adjustments of the pusher member 238 and of the pointer 236 and arm 80 in Figs. 6 and 7 and by substitutions of sets of stamp blocks in the receptacle 92 in Figs. 3 to 5, inclusive, or in the receptacle 106 in Figs. 8 and 9. Calfskins, for instance, run from a normal small of 5½ square feet to a normal large of 14 square feet or throughout a range of less than 10 square feet. Hence the pusher member 238 would be moved counterclockwise from the position of Fig. 6 through an arc of about 144°. Sides run from a normal small of 9½ square feet to a normal large of 18½ square feet which is through a range of somewhat less than 10 square feet. Hence the pusher member 244 would be placed initially about 288° counterclockwise from the position of Fig. 6.

It will be understood, of course, that by making the contact blocks in the rows 86 and 88 somewhat smaller or by making the receptacle 92 (or 106) somewhat larger, with a suitable change in gear ratios, a greater range of work pieces may be readily measured. In any case, the principle of the invention is clearly disclosed in the illustrated embodiments thereof.

As a detail of construction shown particularly as in Figs. 8, 11 and 12, the contact member 82, which is movable in a plane at one side of the row of contact blocks 86, and which is later moved into contact with one of said contact blocks, is provided on one of its edges with a plate 250 of insulation material so that when said contact member 82 is moved to the right in Figs. 8 and 12 it will contact with only one of said contact blocks 86 and be insulated from an adjacent block as clearly indicated in Fig. 11. It will be noted that the contact blocks 86 have inclined contact surfaces, this construction being for the purpose of insuring a sliding contact between the end surfaces on 82 and 86 to keep such surfaces bright and clean. Sliding of the member 82 on the selected block 86 is caused by cam action of their end surfaces when 82 is pressed against 86 during endwise movement of the shaft 74. The fact that sleeve 240 (Fig. 7) is rotatable on shaft 74, being held by spring 230 as above described, explains this relative shifting of 82 on 86 without corresponding rotative movement of the shaft 74.

In operating the machine disclosed in the drawings a skin or other piece of leather is slipped over the table 20 until it is engaged between the bed roll 22 and the measuring wheels 24. As it is fed through the machine by the parts which engage it, the work piece is progressively measured until at the end of the operation all the measuring wheels become stationary and held in position by the pawls 136, 137 (Figs. 2 and 10). This locking of the measuring wheels also results in holding the indicating means in indicating position indefinitely and until released by the operator at the front of the machine by tipping upwardly on the handle 130. Upon thus manipulating the handle 130, the electrical circuit 216 in Fig. 12, or the electrical circuit 148 in the other embodiment (Fig. 8) of the invention, is closed with the result that a lamp or lamps will be lighted for a predetermined length of time in that embodiment of the invention shown in Figs. 3 to 5, inclusive, whereas in the other embodiment of the invention of Figs. 8 and 9, the appropriate work support 102 will be released to drop to indicating position. The worker then at the back of the machine receives the piece of work which has just been measured and stamps it with the appropriate stamping block to record its measurement. The upward movement of the handle 130 initiates return of all the parts to zero position.

Having described my invention, what I claim as new and desire to secure by Letters Patent of the United States is:

1. In a measuring machine having associated therewith a plurality of stamps bearing characters corresponding to measurements upon successive pieces of work within a given range for which the machine is constructed, said stamps being supported individually in a predetermined orderly arrangement and being manually operable independently of each other to mark pieces of work, the combination of means for measuring pieces of work passed successively through the machine, a plurality of indicating devices, one associated with each stamp, and connections between said devices and the work measuring means controllable by said work measuring means to position and thus visually indicate the stamps to be used following successive measurements upon pieces of work.

2. In a measuring machine having associated therewith a plurality of stamps bearing characters corresponding to measurements upon successive pieces of work within a given range for which the machine is constructed, said stamps being supported in a predetermined orderly arrangement for manual operation independently of each other, the combination of means for measuring pieces of work passed successively through the machine, a plurality of visually effective indicating devices, one associated with each stamp, and connections between said devices and the work measuring means controllable by said measuring means to indicate visually the stamps to be used following successive measurements upon pieces of work.

3. In a measuring machine comprising means for measuring pieces of work passed successively through the machine, and having associated therewith a plurality of stamps bearing characters corresponding to measurements upon successive pieces of work within a given range for which the machine is constructed, the combination of means for supporting the stamps individually in a predetermined arrangement for operation independently of each other to mark pieces of work, and a plurality of electrically controlled devices associated with the measuring machine and also with the stamps, one for each stamp, to indicate selectively the stamp or stamps which correspond to the measurement just performed upon a given piece of work.

4. In a measuring machine comprising means for measuring pieces of work passed successively through the machine, and having associated therewith a plurality of stamps bearing characters corresponding to measurements upon successive pieces of work within a given range for which the machine is constructed, the combination of means for supporting the stamps in a predetermined arrangement, a plurality of electrically controlled devices including an equal number of contact blocks individually connected to said devices, one of said devices and its connected block being associated with each stamp, and a movable contact member controllable by the work measuring means to coact selectively with said contact blocks thereby to indicate the stamps to be used following successive measuring operations on different pieces of work.

5. In a measuring machine comprising means for measuring pieces of work passed successively through the machine, and having associated therewith a plurality of stamps bearing characters corresponding to measurements upon successive pieces of work within a given range for which the machine is constructed, the combination of means for supporting the stamps individually in a predetermined arrangement, a light bulb associated with each stamp, and electrical connections between the light bulbs and the measuring machine to be controlled by the latter to light up selectively a bulb or bulbs associated with the stamp or stamps which correspond to the measurement of a piece of work just measured.

6. In a measuring machine comprising means for measuring pieces of work passed successively through the machine, and having associated therewith a plurality of stamps bearing characters corresponding to measurements upon successive pieces of work within a given range for which the machine is constructed, said stamps being supported in a predetermined orderly arrangement, the combination of indicating devices, one associated with each stamp, and controllable by the work measuring means to indicate selectively the stamps to be used following successive measurements upon pieces of work, and manually operable means to initiate operation of the selected indicating device or devices after the completion of a measuring operation.

7. In an area measuring machine comprising means for measuring the areas of pieces of work passed successively through the machine, said means comprising measuring wheels and a totalizing mechanism, means comprising a manually operable member for tripping said measuring wheels and totalizing mechanism to initiate their return to their initial or normal position, and having associated therewith a plurality of stamps bearing characters corresponding to measurements upon successive pieces of work within a given range for which the machine is constructed, said stamps being supported in a predetermined orderly arrangement, the combination of a plurality of indicating devices, one associated with each stamp, said devices being controllable by the measuring means to indicate selectively the stamps to be used following successive measurements upon pieces of work, and means having connection with said manually operable member for initiating operation of the proper indicating device prior to the tripping of said measuring wheels and totalizing mechanism.

8. In a measuring machine having associated therewith a plurality of stamps having numbers thereon and supported in a predetermined orderly arrangement, the combination of means for measuring pieces of work during movement of the latter through the machine, a rotary member arranged to be operated by the work measuring means, a plurality of electrical contact members over which said member moves in spaced relation thereto until the end of the measuring operation, an electrical device associated with each stamp, a plurality of electrical circuits, each circuit including one of said electrical devices and a corresponding electrical contact member, and means under the control of the operator to close that electrical circuit including the electrical contact member corresponding to the position of said rotary member at the end of the measuring operation, whereby there is indicated to a worker at the back of the machine the proper stamp to be used in marking the sheet material just measured.

9. In a measuring machine having associated therewith a plurality of stamps having numbers thereon and supported in a predetermined orderly arrangement, the combination of means for measuring pieces of work during movement of the latter through the machine, a rotary member arranged to be operated by the work measuring means, a plurality of electrical contact members over which said member moves in spaced relation thereto until the end of the measuring operation, means including an operator-controlled member to initiate return of the measuring means to normal position, an electrical device associated with each stamp, a plurality of electrical circuits, each circuit including one of said electrical devices and a corresponding electrical contact member, and means under the control of said operator-controlled member to move said rotary member into contact with that electrical contact member to which it was opposed at the end of the measuring operation, thereby closing a circuit, including said contact member and an associated electrical device, whereby there is indicated to a worker at the back of the machine the proper stamp to be used in marking the sheet material just measured.

10. In an area measuring machine for sheet material of irregular contour having associated therewith a plurality of stamps having numbers thereon and supported in a predetermined orderly arrangement, the combination of a plurality of measuring members uniformly spaced with respect to each other and arranged to contact with a surface of the work during movement of the latter through the machine, totalizing mechanism associated with the work measuring members, a rotary member arranged to be operated by the totalizing mechanism, a plurality of electrical contact members over which said member moves in spaced relation thereto until the end of the measuring operation, an electrical device associated with each stamp, a plurality of electrical circuits, each circuit including one of said electrical devices and a corresponding electrical contact member, and means under the control of the operator to close that electrical circuit including the electrical contact member corresponding to the position of said rotary member at the end of the measuring operation.

11. In an area measuring machine for sheet material of irregular contour having associated therewith a plurality of stamps having numbers thereon and supported in a predetermined orderly arrangement, the combination of a plurality of measuring members uniformly spaced with respect to each other and arranged to contact with a surface of the work during movement of the latter through the machine, totalizing mechanism associated with the work measuring members, a rotary member arranged to be operated by the totalizing mechanism, a plurality of electrical contact members over which said member moves in spaced relation thereto until the end of the measuring operation, means including an operator-controlled member to initiate return of the measuring members, the totalizing mechanism and said rotary member to normal position, an electrical device associated with each stamp, a plurality of electrical circuits, each circuit including one of said electrical devices and a corresponding electrical contact member, and means under the control of said operator-controlled member to move said rotary member into contact with that electrical contact member to which it was opposed at the end of the measuring operation, thereby closing a circuit, including said contact member and an associated electrical device, whereby there is indicated to a worker at the back of the machine the proper stamp to be used in marking the sheet material just measured.

12. In an area measuring machine having associated therewith a plurality of stamps for use in stamping the measurment on a piece of work measured and a receptacle having pockets to receive said stamps individually, the combination of a plurality of spaced measuring wheels adapted to contact a piece of work and to be operated thereby during the passage of the work through the machine, a totalizing mechanism associated with the measuring wheels, a dial, a pointer connected to be operated by said totalizing mechanism and movable over the dial to indicate the area of the piece of work thus measured, a rotary member operatively connected to move with the pointer, a plurality of contact members over which said rotary member successively passes in a plane at one side thereof until said rotary member is positioned opposite one of said contact members at the end of the measuring operation, a plurality of electrical members, one associated with each pocket, a plurality of electrical circuits, each circuit including one of said contact members and one of said electrical pocket members, a manually operable member to initiate return of all of the measuring wheels to initial position, and means arranged to be controlled by said manually operable member to effect movement of said rotary member into contact with that contact member opposite thereto at the end of the measuring operation, thereby to close a circuit including said contact member and one of the electrical pocket members whereby there is indicated to a worker at the machine the proper stamp to be used in stamping measurement on a piece of work just measured.

13. In a measuring machine having associated therewith a plurality of stamps bearing characters corresponding to the measurements upon successive pieces of work within a given range for which the machine is constructed, the combination of means for measuring pieces of work passed successively through the machine, a receptacle having individual pockets for the stamps, and means, including connections between the various pockets of the receptacle and the measuring machine and controllable by the latter, to indicate selectively the stamps to be used following successive measurements upon pieces of work.

14. In a measuring machine having associated therewith a plurality of stamps bearing characters corresponding to the measurements upon successive pieces of work within a given range for which the machine is constructed, the combination of means for measuring pieces of work passed successively through the machine, a receptacle having individual pockets for the stamps, and electrically controlled means, including connections between the various pockets of the receptacle and the measuring machine and controllable by the latter, to indicate selectively the stamps to be used following successive measurements upon pieces of work.

15. In a measuring machine having associated therewith a plurality of stamps bearing characters corresponding to the measurements upon successive pieces of work within a given range for which the machine is constructed, the combination of means for measuring pieces of work passed successively through the machine, a receptacle having individual pockets for the stamps, a light bulb associated with each pocket, and electrical connections between the light bulbs and the measuring machine to be controlled by the latter to light up selectively a bulb or bulbs which correspond to the measurement of a piece of work just measured.

16. In a measuring machine having associated therewith a plurality of stamps bearing characters corresponding to the measurements upon successive pieces of work within a given range for which the machine is constructed, the combination of means for measuring pieces of work passed successively through the machine, a receptacle having individual pockets for the stamps, and a plurality of electrical devices mounted on the receptacle in individual relation to the stamps and controlled by the measuring machine for positioning selectively the stamp or stamps which correspond to the measurement just performed upon a given piece of work.

17. In a measuring machine having associated therewith a plurality of stamps bearing characters corresponding to measurements upon successive pieces of work within a given range for which the machine is constructed, the combination of means for measuring pieces of work passed successively through the machine, means for supporting the stamps individually in a predetermined arrangement, a light bulb associated with each stamp, a plurality of electrical connections between the light bulbs and the measuring machine to be controlled by the latter to light up selectively a bulb or bulbs which correspond to the measurement of a piece of work just measured, manually operable means to initiate closing of the selected electrical connections, and means automatically operative to delay opening of said selected electrical connections whereby the proper light bulb or bulbs remain lighted for a predetermined period of time.

ERASTUS E. WINKLEY.